(12) United States Patent
Fan

(10) Patent No.: US 6,193,222 B1
(45) Date of Patent: Feb. 27, 2001

(54) GAS-LIQUID CONTACT TRAY AND METHOD

(76) Inventor: Zhongliang Fan, 2707 Devonshire Dr., Carrollton, TX (US) 75077

( * ) Notice: Subject to any disclaimer, the term of this patent is extended or adjusted under 35 U.S.C. 154(b) by 0 days.

(21) Appl. No.: 09/245,587

(22) Filed: Feb. 8, 1999

Related U.S. Application Data

(60) Provisional application No. 60/100,991, filed on Sep. 18, 1998, now abandoned.

(51) Int. Cl.$^7$ ....................................................... B01F 3/04
(52) U.S. Cl. ................................. 261/114.3; 261/114.4; 29/896.6
(58) Field of Search ............................. 261/114.3, 114.4, 261/114.5; 29/896.6

(56) References Cited

U.S. PATENT DOCUMENTS

| | | | |
|---|---|---|---|
| 2,784,953 | * | 3/1957 | Ng ........................................ 261/114.3 |
| 3,125,614 | * | 3/1964 | Mayfield et al. .................. 261/114.3 |
| 3,325,155 | * | 6/1967 | Bahout ............................... 261/114.4 |
| 3,333,836 | * | 8/1967 | Bahout ............................... 261/114.4 |
| 3,417,975 | * | 12/1968 | Williams et al. .................. 261/114.3 |
| 3,445,095 | * | 5/1969 | Braun et al. ....................... 261/114.4 |
| 3,603,129 | * | 9/1971 | Williams et al. ..................... 29/896.6 |
| 3,747,905 | * | 7/1973 | Nutter ................................ 261/114.3 |
| 4,225,541 | * | 9/1980 | Vaschuk et al. ................... 261/114.4 |
| 5,147,584 | * | 9/1992 | Binkley et al. .................... 261/114.3 |
| 5,547,617 | * | 8/1996 | Lee et al. ........................... 261/114.4 |

FOREIGN PATENT DOCUMENTS

| | | | | |
|---|---|---|---|---|
| 394058 | * | 8/1973 | (SU) | ................................... 261/114.3 |
| 980743 | * | 12/1982 | (SU) | ................................... 261/114.4 |
| 997707 | * | 2/1983 | (SU) | ................................... 261/114.3 |
| 1012937 | * | 4/1983 | (SU) | ................................... 261/114.3 |

* cited by examiner

*Primary Examiner*—C. Scott Bushey
(74) *Attorney, Agent, or Firm*—Locke Liddell & Sapp LLP

(57) ABSTRACT

A gas-liquid contact tray having a substantially planar deck, a plurality of apertures extending through the deck, and a plurality of valve covers disposed over the apertures. The deck has an upper surface and a lower surface. Each of the valve covers has a cover plate and a first leg extending between the cover plate and the deck for supporting the cover plate over the upper surface of the deck. The cover plate has a perimeter edge having a plurality of alternating extensions and depressions. During operation of the tray a vapor ascends through the apertures and fluid is deposited onto the tray, the fluid flowing across at least a portion of the deck and contacting the ascending vapor, and the fluid thereafter exiting off of the tray. A process for the manufacture of a gas-liquid contact tray, the process: providing a substantially planar deck having an upper surface and a lower surface; and punching the deck to substantially simultaneously create apertures through the deck and valve covers disposed substantially above the apertures. Ones of the valve covers have a cover plate and a first leg extending between the cover plate and the deck for supporting the cover plate over the upper surface of the deck. The cover plates having a perimeter edge having a plurality of alternating extensions and depressions.

22 Claims, 5 Drawing Sheets

GAS-LIQUID CONTACT TRAY AND METHOD

RELATED APPLICATIONS

This application claims the benefit of U.S. Provisional Application No. 60/100,991, filed Sep. 18, 1998, now abandoned and entitled "Gas-Liquid Contact Tray and Method."

FIELD OF THE INVENTION

The present invention relates to methods and apparatus for enhancing exchange processes between two fluids. More particularly, the present invention relates to gas-liquid contact trays utilizing a plurality of valves.

BACKGROUND OF THE INVENTION

Gas-liquid contact trays are used for a variety of purposes in the field of chemical processing, including use in distillation columns to separate selected components from a multi-component stream. Gas-liquid contact trays are available in multiple varieties, including "cross-flow" configurations. In a cross-flow configuration, gas-liquid contact trays generally comprise a solid deck having a plurality of apertures. Liquid is deposited on and flows across at least a portion of the deck, and contacts vapor ascending through the apertures. The area in which the liquid contacts the vapor on the deck is designated the "active area." In using a gas-liquid contact tray, liquid is generally directed onto the deck through a channel, or "inlet downcomer." In a distillation column comprising a plurality of trays, the liquid may descend from a tray or other apparatus located higher in the column. Liquid exiting the deck is generally directed through a second channel, or "exit downcomer." In a distillation column comprising a plurality of trays, the liquid may descend to a tray or other apparatus located lower in the column. Decks may be divided into multiple sections, with each section being served by an inlet and exit downcomer.

"Weeping" and "liquid entrainment" are two potentially undesirable conditions which may occur in gas-liquid contact trays. Weeping occurs when liquid flowing across a deck flows into and through the apertures to lower levels of the processing apparatus. Liquid entrainment occurs when ascending vapor captures liquid flowing across a deck and carries the captured liquid to higher levels of the processing apparatus.

The reaction rates between the liquid and the vapor on a gas-liquid contact tray, as well as certain other hydraulic characteristics (such as liquid entrainment and weeping), are dependent upon the intimacy of contact and degree of intermixing between the liquid and the vapor on the deck of the gas-liquid contact tray. Two factors influencing the intimacy of contact and degree of intermixing are the size of the active area on a tray deck and the pattern of contact between the liquid and the vapor within the active area.

The size of the active area influences the intimacy of contact and degree of intermixing at least in part by influencing the possible contact time between the liquid and the vapor. Larger active areas generally improve the intermixing of a liquid and a vapor and generally increase the reaction rates between the fluid and the vapor. Longer active areas (measured parallel to the direction of liquid flow on the deck) clearly provide longer time periods for interaction between a gas and a liquid. Similarly, broader active areas (measured perpendicular to the direction of liquid flow on the deck) also allow longer time periods for interaction. The depth of the liquid flowing across the deck is closely regulated on many trays to prevent flooding of the processing apparatus. Though the ability to vary the liquid depth is substantially unavailable in such situations, the volume of liquid flowing over the deck may still be controlled by varying either the breadth of the area over which the fluid runs, or the velocity of the stream of fluid flowing through the area. When the breadth of the area is increased, the velocity of the stream may decrease, and thereby maintain the liquid on the tray deck for a longer period of time.

The pattern of the contact between the gas and liquid on a tray deck also influences the intimacy of contact and degree of intermixing. For example, uneven liquid flow patterns across a tray deck (including flow patterns wherein "eddies" are created along a deck's periphery) or, inconsistent vapor flow rates through the various apertures of a deck, may disadvantageously create inconsistent intermixing of liquid and gas. Further, the design of vapor/liquid contact mechanisms used on or with a tray deck, such as the size and configuration of the deck's apertures and the presence or absence of valve covers over those apertures, may also influence the pattern of contact between a gas and a liquid.

In the modern distillation industry two kinds of trays are often used: sieve trays and valve trays. Sieve trays are generally constructed with a large number of apertures. In sieve trays ascending vapor flows upward through the apertures to contact liquid flowing across the tray deck, and substantially no physical barrier exists between the apertures and liquid. The contact between vapor and liquid on the tray deck of a sieve tray is characterized by a shearing action between the ascending gas and cross-flowing liquid.

The diameter, or "thickness," of a vapor stream arising from a sieve tray aperture is naturally affected by the size of the aperture. Beneficially, a fixed volume of vapor ascending in a large number of thin streams of vapor will tend to have a larger contact area with the liquid through which the vapor passes than the same volume of vapor ascending in a smaller number of relatively thicker streams of vapor. Thus a larger number of thin streams ascending from smaller apertures may achieve better liquid/vapor intermixing and process efficiency than a smaller number of large streams ascending from larger apertures. The larger number of smaller apertures are also characterized as having a greater total "periphery length" (i.e. the sum of the perimeter lengths of the individual apertures) than the smaller number of larger apertures through which a commensurate volume of vapor passes.

However, the apertures of a sieve tray are typically constructed using an automatic punching machine operating at a very high speed, and the cost of aperture construction is dependent upon the size of aperture being constructed (smaller apertures being more costly). This higher cost associated with producing smaller apertures having a larger collective periphery length may be a limiting factor in selecting an aperture size for a sieve tray design.

Valve trays are constructed with valve covers mounted above the apertures. The valve covers may be "fixed" or "floating." Fixed valves are integrally attached to the tray deck. Floating valves are capable of a limited range of movement toward and away from the tray deck. Frequently floating valves move away from a tray deck in response to pressure exerted upon the floating valves by vapor ascending through the apertures above which the valves are mounted. In valve trays ascending vapor flows first upward through the apertures and then at least somewhat laterally due to the presence of the valve cover mounted above the aperture. More specifically, the vapor must flow through an "escape area" between the valve cover and the tray deck, and equal to the product of the perimeter length of the valve cover and the net rise between the upper surface of the tray deck and the lower surface of the valve cover.

Valve trays frequently utilize a smaller number of larger apertures than sieve trays, possibly in response to the relatively high cost of valve construction. Among valve trays, floating valve trays are generally more expensive to manufacture than fixed valve trays because each individual floating valve cover must be manually or mechanically installed, while fixed valve covers and the corresponding apertures may be constructed substantially simultaneously through mechanical processes such as punching. However, the speed of the mechanical punching processes utilized in the construction of even fixed valves are typically less than the speed of the mechanical punching processes utilized in the construction of sieve tray apertures and, therefore, the cost to make valve trays is generally significantly higher than the cost to make sieve trays. The utilization of relatively large net rises and aperture sizes on valve trays is one method of reducing the costs of valve tray construction.

A perceived benefit of valve trays over sieve trays is that vapor flowing exiting through a valve's escape area may flow at least somewhat laterally along the tray deck. The vapor may thus be thrust at least somewhat along the plane in which the liquid flows across the tray deck. The resulting pattern of vapor liquid contact may be superior to the shearing action found in sieve trays, because the depth of the liquid flowing over a tray deck may be very thin (with only froth located above the liquid) and ascending vapor in a sieve tray may have very little distance to rise before contact with the liquid is lost. However, despite the advantages in vapor/liquid intermixing realized through the use of valve trays, a need for improvement in valve cover design still remains. Specifically, the relatively large size and small number of apertures found in a valve tray may limit the total perimeter length of a valve tray's apertures and may produce thicker streams of vapor and smaller contact areas between the liquid and the vapor. Furthermore, in order to achieve a desired vapor/liquid handling capacity in a valve tray, a particular valve size and net rise may be indicated. A large net rise, in turn, may impede a valve cover's ability to beneficially transfer any lateral component to ascending vapor and force the vapor stream toward the tray deck.

To combat these negative effects, valve tray designers have recently sought to achieve better performance through the use of mini-valves having small net rises. The performance gained through the use of such mini-valves is accompanied by corresponding increase in manufacturing costs, and therefore a better answer in needed. Specifically, designs for fixed and floating valves are needed which can incorporate the benefits of thin vapor streams and can direct ascending vapor streams laterally along a tray deck (by limiting the required net rise while maintaining a desired escape area).

SUMMARY OF THE INVENTION

The present invention provides improvements to the design of valves utilized in gas-liquid contact trays and methods for using the same. The present embodiment of the improved gas-liquid contact tray comprises a deck, a plurality of apertures extending through the deck, and a plurality of valve covers disposed substantially over the apertures. The valve covers comprise a cover plate and at least one leg extending from the cover plate toward the deck. The cover plate in turn has a perimeter edge which comprises a plurality of alternating extensions and depressions. In one embodiment the extensions of the perimeter edge are curved, and in others the extensions comprise partial circles having radii of about 3 millimeters. During operation of the gas-liquid contact tray vapor ascends through the apertures and liquid is deposited onto the tray. The liquid then flows across at least a portion of the deck and contacts the ascending vapor before exiting off of the tray. In certain embodiments the liquid maybe deposited onto the tray from an inlet downcomer disposed substantially above the tray, and may exit the tray into an outlet downcomer disposed substantially adjacent the tray.

The apertures of particular embodiments have an aperture edge comprising a plurality of alternating depressions and extensions. The depressions of the aperture edge may in one embodiment be curved, and in other embodiments comprise partial circles having radii of about 3 millimeters. In certain embodiments the aperture edge and perimeter edge may correspond in configuration.

Acceptable cover plate configurations include trapezoidal and rectangular, and acceptable valve cover types include fixed and floating. Fixed valve covers, which have legs that are integrally attached to the deck, may be formed by processes including mechanical stamping and punching.

The extensions and depressions located on the perimeter edge of the valve cover and the aperture edge increase the respective lengths of the perimeter edge and aperture edge, which in turn may decrease the net rise required to achieve a desired escape area and thereby more effectively direct vapor that has ascended through the apertures laterally along the surface of the deck. Furthermore, the presence of the extensions and depressions on the perimeter edge of the valve cover and on the corresponding aperture edge may aid in the partitioning of any thick vapor streams ascending from the corresponding apertures into more numerous and thinner vapor streams.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENTS

Figure 1:
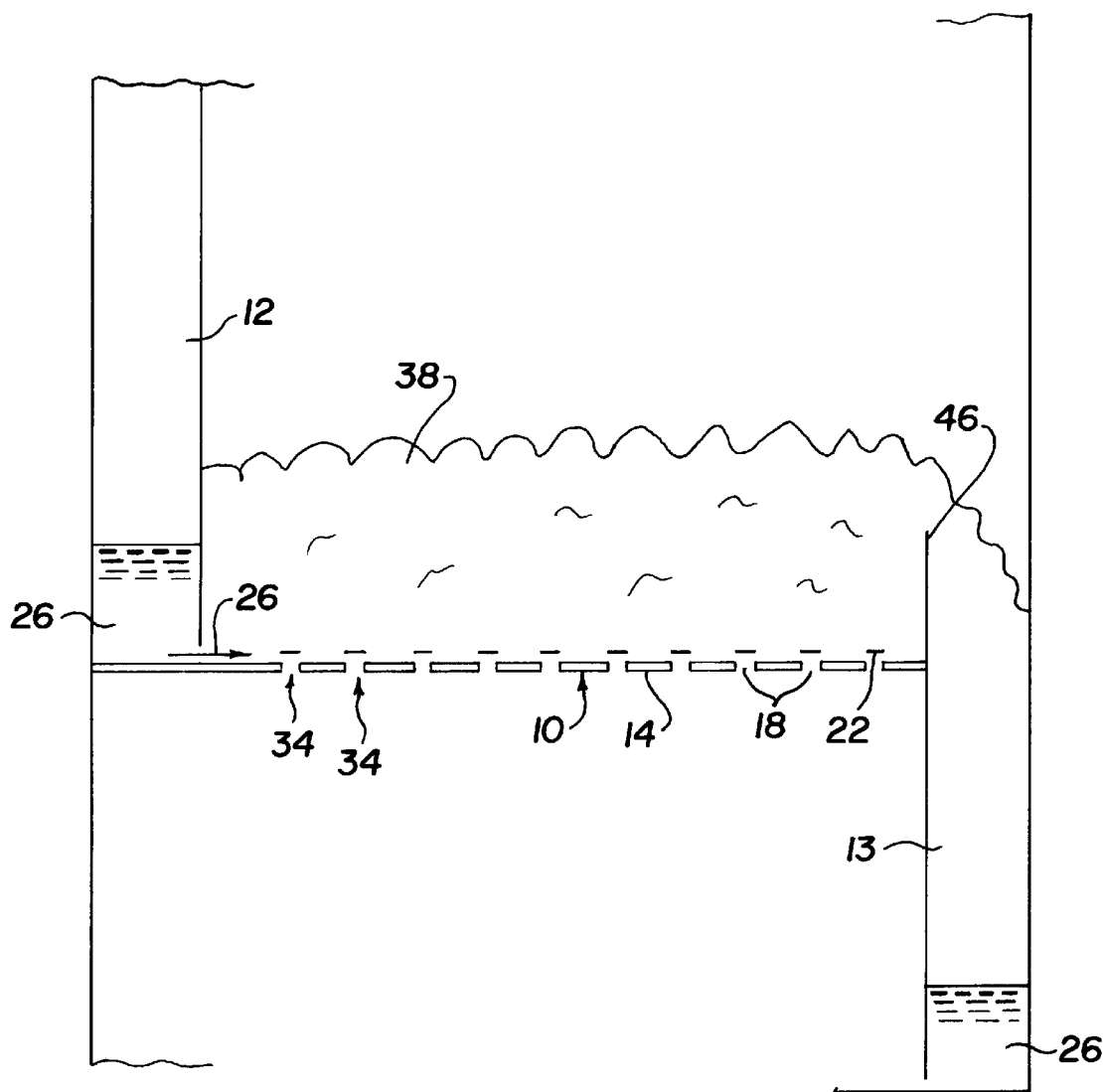
FIG. 1 is a side view of a gas-liquid contact tray of the present invention.

Referring to FIG. 1, there is illustrated a side view of a gas-liquid contact tray of the present invention, generally defined by the numeral 10, together with associated inlet downcomer 12 and exit downcomer 13. Tray 10 comprises a deck 14, a plurality of apertures 18 extending through deck 14, and a plurality of valve covers 22 mounted on deck 14 and positioned over apertures 18. When tray 10 is operating, liquid 26 flows through inlet downcomer 12 and onto deck 14. Liquid 26 then flows across deck 14. Vapor 34 ascends through apertures 18 and contacts liquid 26. The interaction of vapor 34 and liquid 26 then forms a froth 38 which extends across the length of deck 14 to a weir 46. Froth 38 then flows over weir 46 and into exit downcomer 13, from which liquid 26 may be deposited onto additional gas-liquid contacting trays or other processing apparatuses if desired.

Figure 2:
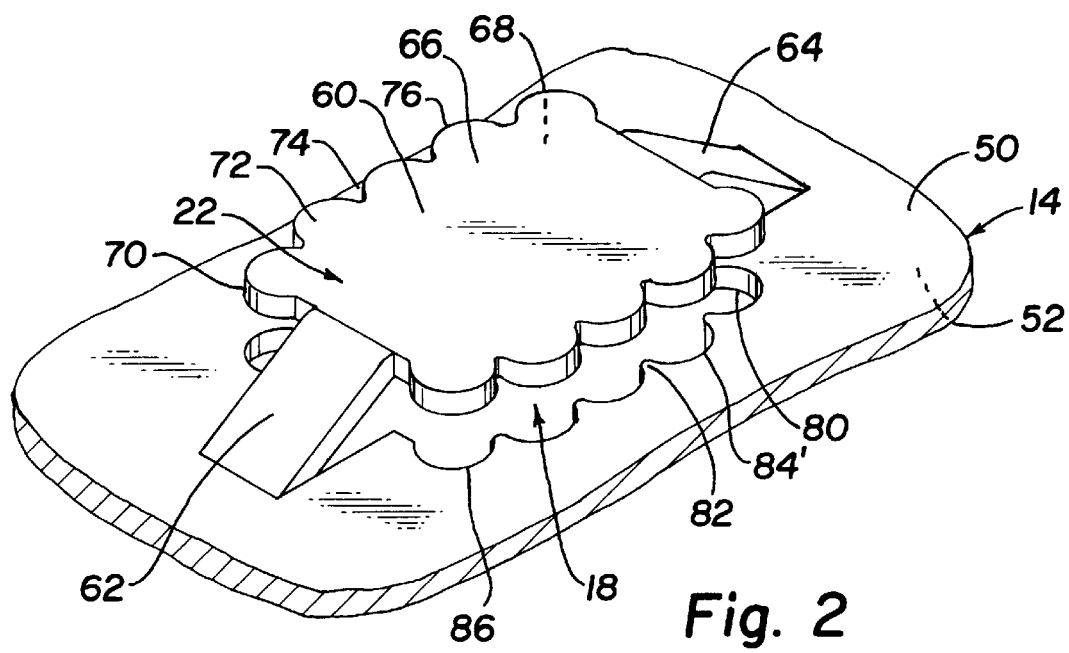
FIG. 2 is a perspective view of an aperture and valve cover of a gas-liquid contact tray of the present invention.

FIG. 2 illustrates a perspective view of an aperture 18 and valve cover 22 of the gas-liquid contact tray of FIG. 1. Deck 14 comprises an upper surface 50 and a lower surface 52. Valve cover 22 is a fixed valve cover and comprises a cover plate 60, a first leg 62, and a second leg 64. First leg 62 and second leg 64 are integrally attached to substantially opposite ends of cover plate 60, extend downwardly and outwardly toward deck 14, and are integrally attached to deck 14. Cover plate 60 is substantially planar and substantially rectangular in configuration, and comprises a first surface 66, a second surface 68, and perimeter edge 70. The plane defined by cover plate 60 is substantially parallel to the plane defined by deck 14. The distance between upper surface 50 of deck 14 and second surface 68 of cover plate 60 is defined as the net rise 194. Perimeter edge 70 comprises a series of alternating extensions 72 and depressions 74. Extensions 72 are curved and comprise partial circles having radii, for purpose of example only, of about 3 millimeters. Depressions 74 are formed by the intersection of adjacent partial circle extensions 72. Therefore perimeter edge 70 comprises a series of intersecting circular arcs 76.

Still referring to FIG. 2, aperture 18 has an aperture edge 80 comprising a series of alternating depressions 84 and extensions 82. Depressions 84 are curved and comprise partial circles having radii, for purpose of example only, of about 3 millimeters. Extensions 82 are formed by the intersection of adjacent partial circle depressions 84. Therefore perimeter edge 80 is also comprised of a series of intersecting circular arcs 86 which, as shown, correspond to the circular arcs 76 of the perimeter edge 70. Valve cover 22 and aperture 18 may be formed from deck 14 through metal shaping technology such as punching or stamping. It should be understood that while, in the embodiment of FIG. 2, extensions 72 and depressions 74 of perimeter edge 70 align with and correspond to extensions 82 and depressions 84 of aperture edge 80 (extensions 72 being substantially opposite depressions 84), such correspondence between perimeter edge 70 and aperture edge 80 is not a requirement of this invention.

Figure 3:
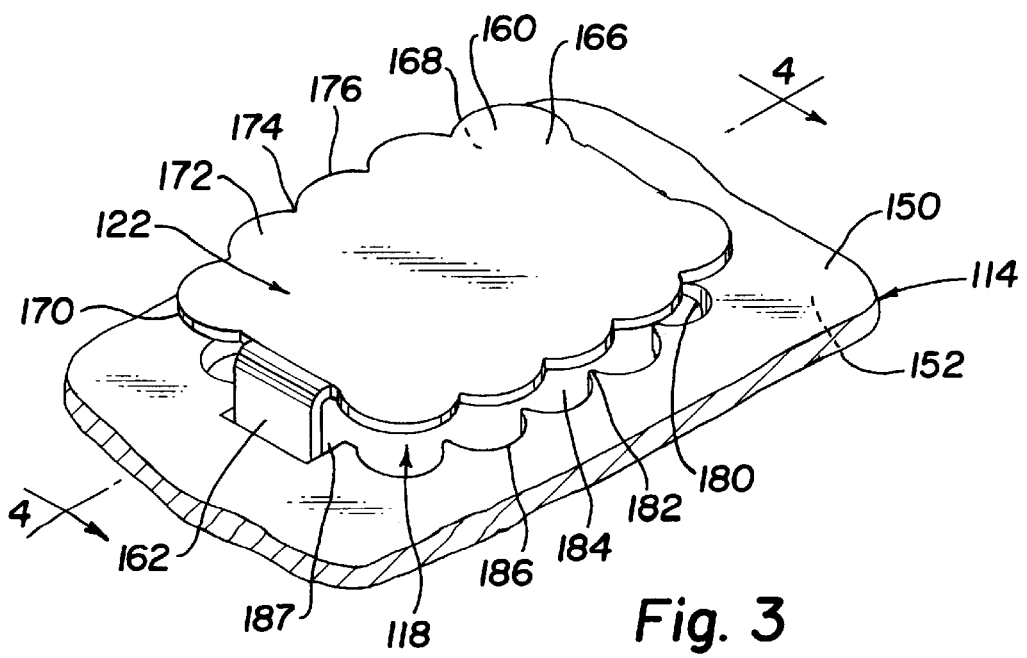
FIG. 3 is a perspective of an alternate embodiment of an aperture and valve cover of a gas-liquid contact tray of the present invention.

In FIG. 3 there is shown a perspective view of an aperture 118 and valve cover 122 of an alternate embodiment of a gas-liquid contact tray 110 of the present invention. Deck 114 comprises an upper surface 150 and a lower surface 152. Valve cover 122 is a floating valve cover and comprises a cover plate 160, a first leg 162, and a second leg 164 (illustrated in FIG. 4). First leg 162 and second leg 164 are attached to substantially opposite ends of cover plate 160, and extend downwardly toward and through deck 114. Cover plate 160 is substantially planar and substantially rectangular in configuration and comprises a first surface 166, a second surface 168, and perimeter edge 170. The plane defined by cover plate 160 is substantially parallel to the plane defined by deck 114. Perimeter edge 170 comprises a series of alternating extensions 172 and depressions 174. Extensions 172 are curved and comprise partial circles having radii, for purpose of example only, of about 3 millimeters. Depressions 174 are formed by the intersection of adjacent partial circle extensions 172. Therefore perimeter edge 170 is comprised of a series of intersecting circular arcs 176.

Still referring to FIG. 3, aperture 118 has an aperture edge 180 comprising a series of alternating depressions 184 and extensions 182. Depressions 184 are curved and comprise partial circles having radii, for purpose of example only, of about 3 millimeters. Extensions 182 are formed by the intersection of adjacent partial circle depressions 184. Therefore perimeter edge 180 is also comprised of a series of intersecting circular arcs 186. Aperture 118 further includes first slot 187 and second slot 188 (illustrated in FIG. 4).

Figure 4:
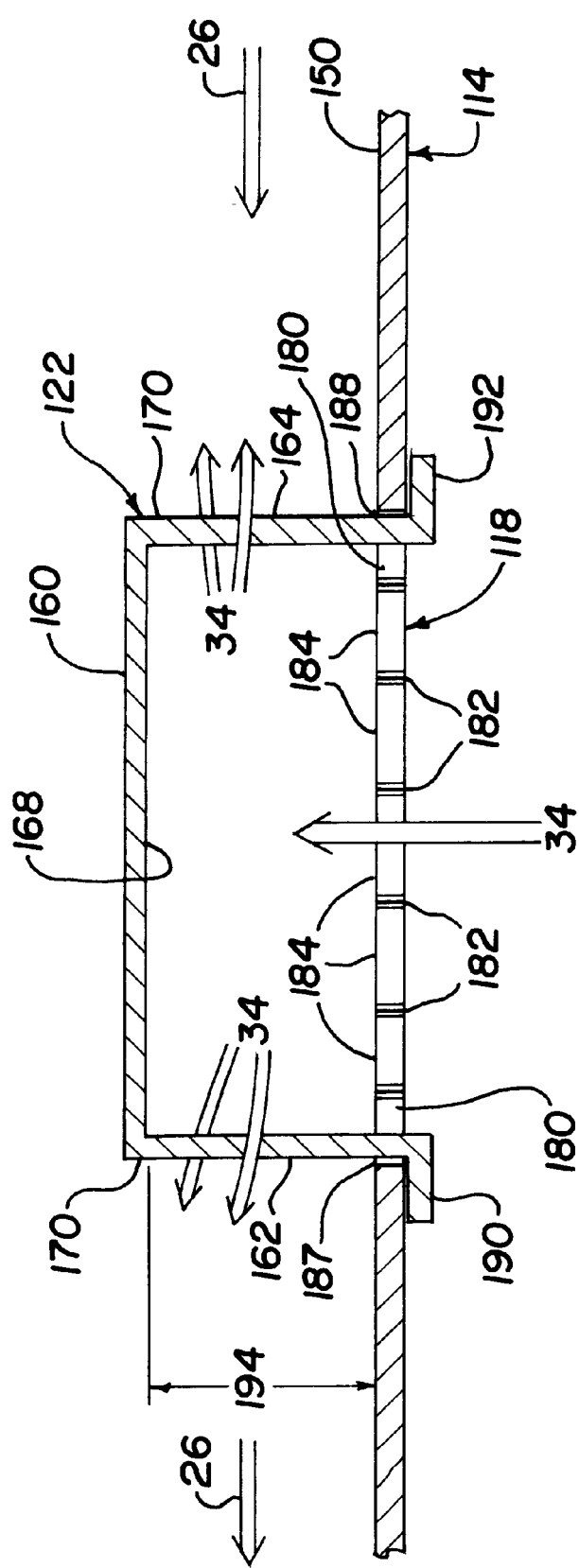
FIG. 4 is a cross-sectional view taken generally along sectional line 4—4 of FIG. 3 of an aperture and valve cover of the gas-liquid contact tray of FIG. 3.

FIG. 4 illustrates a side cross-sectional view of aperture 118 and valve cover 122 of the gas-liquid contact tray 110 of FIG. 3. Valve cover 122 is slidably mounted within deck 114 substantially above aperture 118. First and second legs 162 and 164 extend through first and second slots 187 and 188 respectively, and terminate in outwardly extending first and second flanges 190 and 192 below deck 114. Flanges 190 and 192 prevent accidental removal of valve cover 122 upwardly through aperture 118. First and second legs 162 and 164 may move upward and downward within first and second slots 187 and 188, allowing cover 122 to float toward or away from deck 114 in response to the presence or absence of a stream of ascending vapor 34 impacting upon second surface 168 of cover plate 160.

Ascending vapor 34 is directed by valve cover 122 at least somewhat laterally between perimeter edge 170 and aperture edge 180, and contacts liquid 26. The distance between second surface 168 of cover plate 160 and upper surface 150 of deck 114 is the net rise 194. The product of net rise 194 and the length of perimeter edge 170 is the escape area. The presence of the extensions and the depressions on the perimeter edge 170 increases the length of perimeter edge 170, and therefore advantageously reduces the net rise 194 required to achieve a desired escape area. A reduced net rise may in turn more forcefully direct ascending vapor 34 laterally along deck 114, and thereby enhance the contact between ascending vapor 34 and liquid 26 flowing across deck 114. Furthermore, the presence of extensions 172 and depressions 174 on valve cover 122 and the presence of similar structures 184 and 182 on the corresponding aperture 118 may aid the transformation of the vapor 34 stream ascending through aperture 118 into a plurality of smaller, thinner vapor 34 streams. For example, one smaller and thinner vapor 34 stream may correspond to each depression 174 on valve cover 122. Apertures 118 and valve covers 122 may thereby mimic the performance of a larger number of small sieve tray apertures, and achieve a corresponding improvement in gas-liquid contact. These advantages of the embodiment of FIGS. 3 and 4 are similarly applicable to the preceding embodiment of FIG. 2 and also the subsequent embodiments of FIGS. 5 & 6. For purposes of example only, a valve of the type illustrated in FIGS. 2, 3, and 4 might be constructed having a net rise of about 4.5 millimeters and a perimeter edge length of about 110 millimeters.

Figure 5:
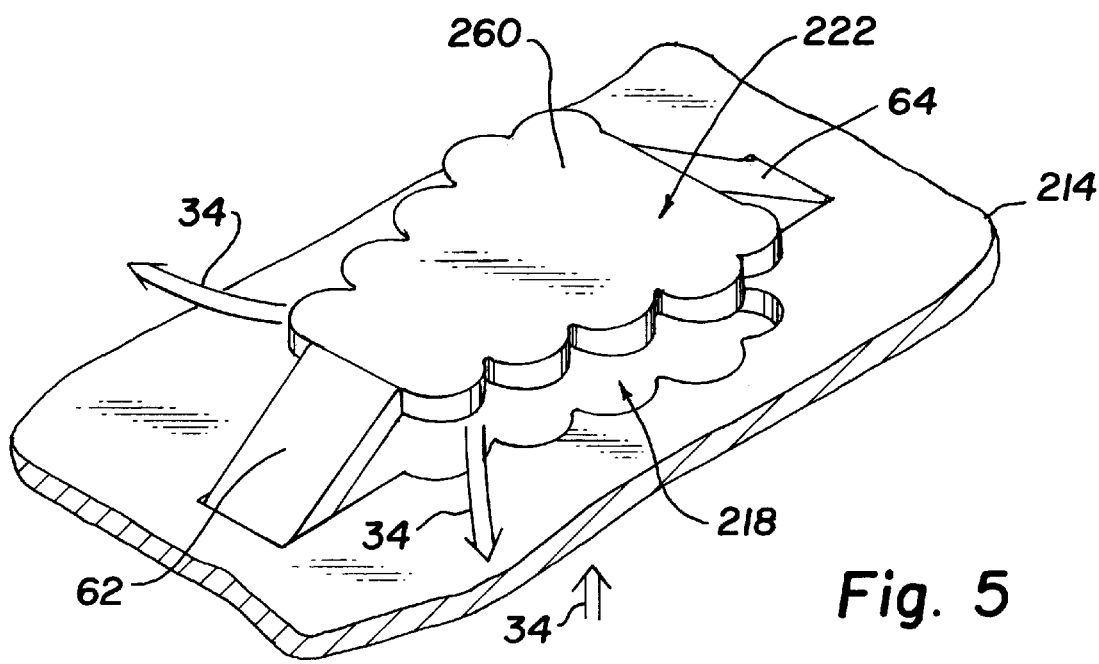
FIG. 5 is a perspective of a second alternate embodiment of an aperture and valve cover of a gas-liquid contact tray of the present invention.

FIG. 5 illustrates a perspective view of an aperture 218 and a fixed valve cover 222 of an alternate embodiment of a gas-liquid contact tray of the present invention. The embodiment of FIG. 5 is substantially similar to that of FIG. 2, except that both cover plate 260 and aperture 218 are substantially trapezoidal in configuration. This design has the added benefit of directing ascending vapor 34 generally toward leg 62 and the narrow end of cover plate 260, which in turn directs the flow of liquid 26 impacted by the directed vapor 34 toward leg 62. Different generalized configurations of cover plates and apertures may be desired depending upon many considerations, including the specific application to which the present gas-liquid contact tray is applied, the location of the valve cover on the tray deck, and the liquid flow conditions experienced at a location on the tray deck. The trapezoidal configuration of apertures 218 and valve covers 22 of FIG. 5 may be particularly desirable when located toward the periphery of a tray deck 214 as a preventative measure guarding against the formation of stagnant areas or eddies in the liquid 26 flow at the periphery of deck 214.

Figure 6:
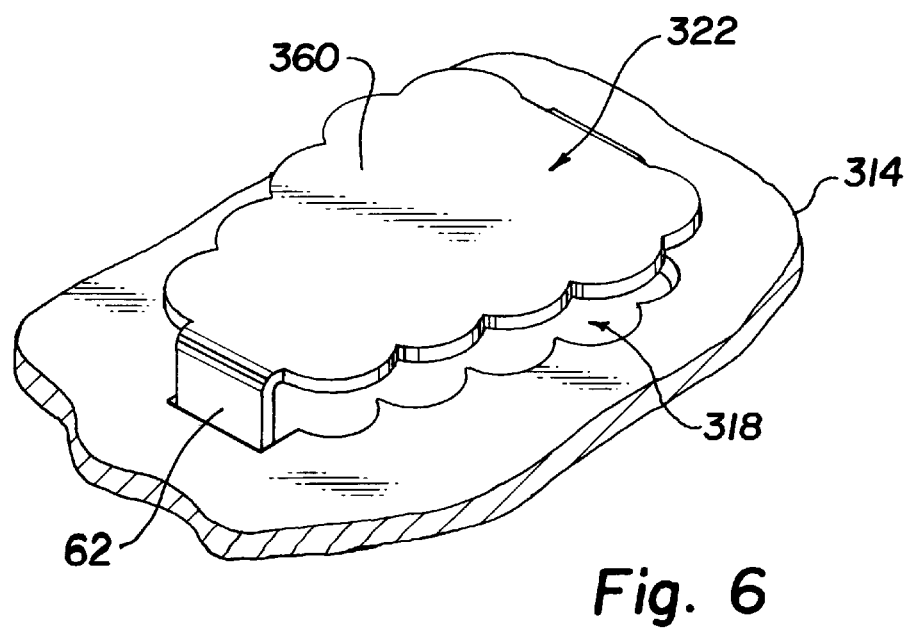
FIG. 6 is a perspective of a third alternate embodiment of an aperture and valve cover of a gas-liquid contact tray of the present invention.

FIG. 6 illustrates a perspective view of an aperture 318 and a floating valve cover 322 of an alternate embodiment of a present gas-liquid contact tray of the present invention. The embodiment of FIG. 6 is substantially similar to that of FIG. 3, except that both cover plate 360 and aperture 318 are substantially trapezoidal in configuration. The embodiment of FIG. 6 enjoys many of the advantages associated with the embodiment of FIG. 5 and may also be particularly desirable when located toward the periphery of a tray deck 314. For purposes of example only, a valve of the type illustrated in FIGS. 5 and 6 might be constructed having a net rise of about 4.5 millimeters and a perimeter edge length of about 95 millimeters.

Figure 7:
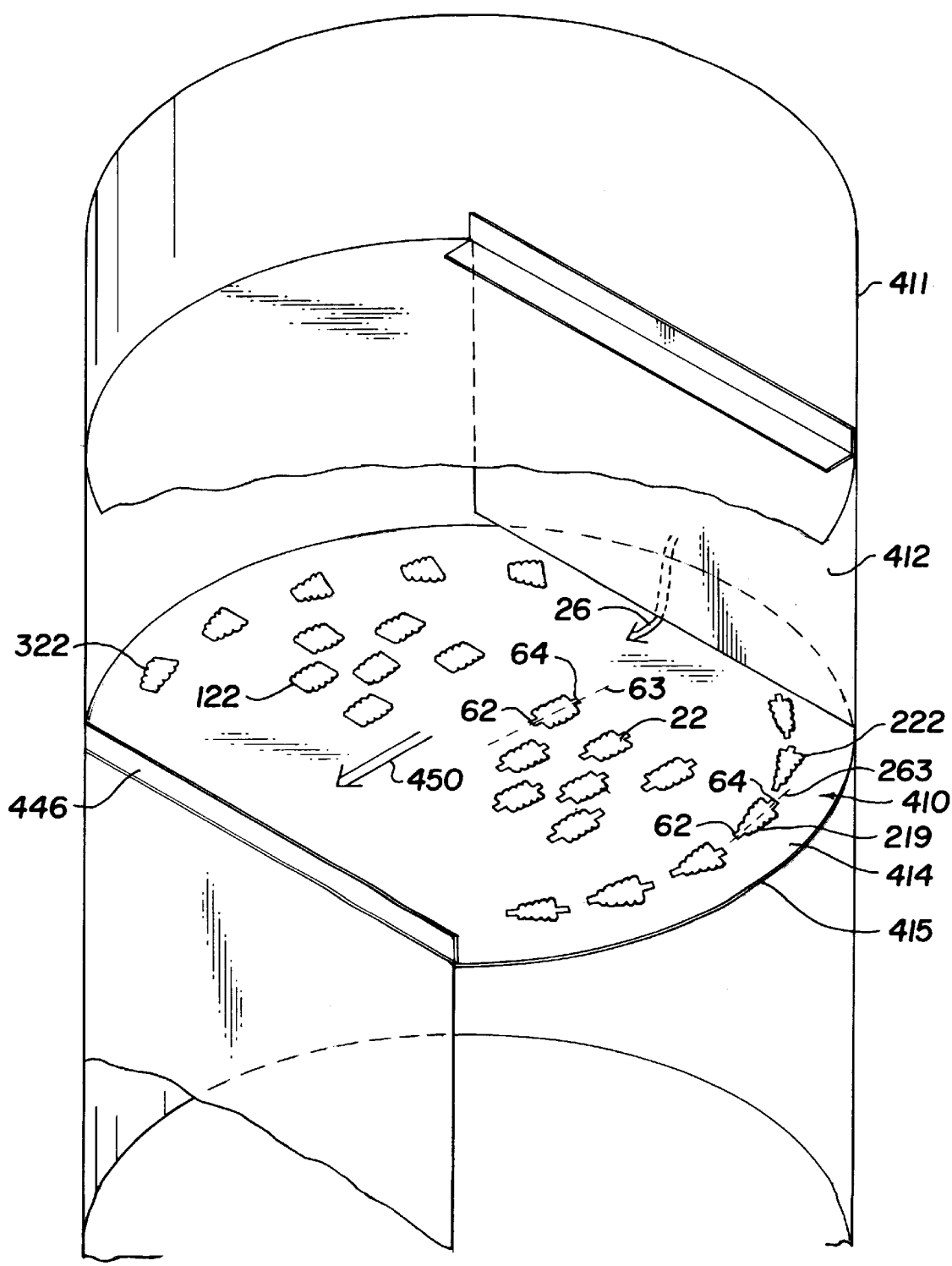
FIG. 7 is a perspective view of a gas-liquid contact tray of the present invention utilizing a particular pattern of rectangular and trapezoidal valves.

FIG. 7 illustrates a perspective view of a gas-liquid contact tray 410 of the present invention. Gas-liquid contact tray 410 is positioned within a distillation column 411. Inlet downcomer 412 is positioned above deck 414. Deck 414 extends from below downcomer 412 across distillation column 411 to weir 446. Deck 414 utilizes both fixed valve covers 22 of a rectangular configuration and fixed valve covers 222 of a trapezoidal configuration. Note that each valve cover is mounted above an aperture of corresponding configuration. A semi-circular pattern of trapezoidal valve covers 222 are utilized along curved edge 415. The main axes 263 between first and second legs 62 and 64 of trapezoidal valve covers 222 are oriented substantially parallel to curved edge 415, with narrow ends 219 of trapezoidal valve covers 222 oriented toward weir 446. Rectangular valve covers 22 are utilized within the semi-circle formed by trapezoidal valve covers 222. The main axes 63 between first and second legs 62 and 64 of rectangular valve covers 22 are oriented substantially parallel to the general direction of liquid flow 450 across deck 414. For the purpose of example only, a similar system utilizing floating valve covers 122 and 322 is illustrated on the opposite half of deck 414. The use of trapezoidal valves toward curved edge 415 of deck 414 is intended to prevent stagnation or eddies in the flow of liquid 26 across deck 414, by directing the flow of liquid along curved edge 415 and toward weir 446.

It should be understood that this invention does not require any particular number of valve cover legs or orientation of valve cover legs relative to the direction of flow of liquid across the tray deck. It should also be understood that though the embodiments previously described utilize extensions that are substantially circular in configuration, this invention may also utilize extensions of other shapes and configurations. Further, the perimeter length, size, placement, and orientation of the apertures and valve covers on the tray deck, and the number of extension and depressions on each aperture and valve cover, as well as the net rise, are all variables which may be optimized depending upon the specific application to which the tray of this invention is applied. It should also be understood that though the illustrated embodiments utilize valve covers that are generally rectangular or trapezoidal in configuration, other general configurations, such as circular or oval, may also be utilized. In addition, the instant invention may be practiced in cooperation with a large variety of downcomer designs including, but not limited to swept-back downcomers, sloped downcomers, and truncated downcomers. Further, gas-liquid contact trays embodying the present invention may utilize multiple downcomers and may be divided into a plurality of discrete or non-discrete sections, each of which may be served by distinct inlet and outlet downcomers.

Furthermore, though the above description relates several embodiments of the instant invention, variations and additional features and functions within the skill of the art are also

I claim:

1. A gas-liquid contact tray comprising:
a substantially planar deck having an upper surface and a lower surface;
a plurality of apertures extending through said deck; and
a plurality of valve covers disposed over said apertures;
each of said valve covers having a cover plate substantially parallel to said substantially planar deck and a first leg extending between said cover plate and said deck for supporting said cover plate over said upper surface of said deck, said cover plate having a perimeter edge, said perimeter edge comprising a plurality of alternating extensions and depressions, said extensions and depressions having radii of about 3 millimeters.

2. The gas liquid contact tray of claim 1 wherein said extensions of said perimeter edge are curved in configuration.

3. The gas liquid contact tray of claim 2 wherein said depressions of said perimeter edge are formed by the intersection of adjacent curved extensions.

4. The gas liquid contact tray of claim 2 wherein said extensions of said perimeter edge comprise partial circles.

5. The gas-liquid contact tray of claim 1 wherein said apertures have an aperture edge comprising a plurality of alternating depressions and extensions.

6. The gas-liquid contact tray of claim 5 wherein said perimeter edge and said aperture edge substantially correspond in configuration.

7. The gas liquid contact tray of claim 6 wherein said depressions of said perimeter edge are formed by the intersection of adjacent curved extensions, and the extensions of said aperture edge are formed by the intersection of adjacent curved depressions.

8. The gas-liquid contact tray of claim 6 wherein said extensions of said perimeter edge and said depressions of said aperture edge comprise partial circles.

9. The gas-liquid contact tray of claim 8 wherein said partial circles of said aperture edge depressions have radii of about 3 millimeters.

10. The gas-liquid contact tray of claim 6 wherein said extensions of said perimeter edge of said cover plates are disposed opposite said depressions of said aperture edge.

11. The gas-liquid contact tray of claim 5 wherein said extensions and depressions of said perimeter edge of said cover plates align with said depressions and extensions of said aperture edge.

12. The gas-liquid contact tray of claim 5 wherein said extensions of said perimeter edge and said depressions of said aperture edge are curved in configuration.

13. The gas-liquid contact tray of claim 1 wherein at least one of said cover plates has a substantially rectangular configuration.

14. The gas-liquid contact tray of claim 1 wherein at least one of said cover plates has a substantially trapezoidal configuration.

15. The gas-liquid contact tray of claim 1 wherein at least one of said cover plates has a substantially rectangular configuration and at least one of said cover plates has a substantially trapezoidal configuration.

16. The gas-liquid contact tray of claim 1 wherein each of said valve covers are fixed valve covers further having a second leg, said first leg and said second leg attached to substantially opposite ends of said cover plate, said first leg and said second leg extending downwardly and outwardly toward said deck and being integrally attached to said deck for supporting said cover plates above said upper surface of said deck.

17. The gas-liquid contact tray of claim 16 wherein each of said apertures is formed substantially simultaneously with said valve cover disposed over said aperture through a process chosen from the group consisting of mechanical stamping and mechanical punching.

18. The gas-liquid contact tray of claim 1 wherein each of said valve covers are floating valve covers further having a second leg, and wherein said aperture includes a first slot and a second slot, said first leg and said second leg attached to substantially opposite ends of said cover plate, said first leg and said second leg extending downwardly toward and through said deck and terminating in a first and second flange respectively, said first leg and said second leg slidably engaging said first slot and said second slot of said aperture respectively, to thereby allow movement of said valve cover toward and away from said deck, said first and second flanges preventing upward removal of said valve covers from said deck.

19. A gas-liquid contact tray comprising:

a substantially planar deck having an upper surface and a lower surface;

a plurality of apertures extending through said deck; and a plurality of valve covers disposed over said apertures;

each of said valve covers having a cover plate substantially parallel to said substantially planar deck and a first leg extending between said cover plate and said deck for supporting said cover plate over said upper surface of said deck, said cover plate having a perimeter edge, said perimeter edge comprising a plurality of intersecting curves, said intersecting curves having radii of about 3 millimeters.

20. The gas-liquid contact tray of claim 19 wherein said perimeter edge comprises a plurality of intersecting circular arcs.

21. A gas-liquid contact tray system comprising:

a gas-liquid contact tray;

an inlet downcomer disposed above said tray; and an outlet downcomer disposed adjacent to said tray;

wherein said tray comprises a substantially planar deck having an upper surface and a lower surface, a plurality of apertures extending through said deck, and a plurality of valve covers disposed over said apertures, each of said valve covers having a cover plate substantially parallel to said substantially planar deck and a first leg extending between said cover plate and said deck for supporting said cover plate over said upper surface of said deck, said cover plate having a perimeter edge, said perimeter edge comprising a plurality of alternating extensions and depressions, said extensions and depressions having radii of about 3 millimeters, wherein during operation of said tray a vapor ascends through said aperture passing over said perimeter edge of said cover plate thereby dividing said vapor into multiple vapor streams and decreasing turbulence of said vapor and fluid is deposited onto said tray, said fluid flowing across at least a portion of said deck and contacting said ascending vapor, and said fluid thereafter exiting off of said tray.

22. A process for the manufacture of a gas-liquid contact tray, the process comprising:

providing a substantially planar deck having an upper surface and a lower surface;

punching said deck to substantially simultaneously create apertures through said deck and valve covers disposed substantially above said apertures;

wherein at least one of said valve covers have a cover plate substantially parallel to said substantially planar deck and a first leg extending between said cover plate and said deck for supporting said cover plate over said upper surface of said deck, said cover plate having a perimeter edge, said perimeter edge comprising a plurality of alternating extensions and depressions, said extensions and depressions having radii of about 3 millimeters.

* * * * *